(12) United States Patent
May (10) Patent No.: US 10,703,956 B2
(45) Date of Patent: Jul. 7, 2020

(54) USE OF ALKALI METAL SILICATES DURING FORMULATION OF DRILLING FLUIDS

(71) Applicant: Halliburton Energy Services, Inc., Houston, TX (US)

(72) Inventor: Preston Andrew May, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 219 days.

(21) Appl. No.: 15/751,147

(22) PCT Filed: Oct. 2, 2015

(86) PCT No.: PCT/US2015/053751
§ 371 (c)(1),
(2) Date: Feb. 7, 2018

(87) PCT Pub. No.: WO2017/058250
PCT Pub. Date: Apr. 6, 2017

(65) Prior Publication Data
US 2018/0244972 A1 Aug. 30, 2018

(51) Int. Cl.
*C09K 8/12* (2006.01)
*C09K 8/03* (2006.01)
(Continued)

(52) U.S. Cl.
CPC .................. *C09K 8/12* (2013.01); *C09K 8/03* (2013.01); *C09K 8/14* (2013.01); *E21B 21/062* (2013.01)

(58) Field of Classification Search
CPC .... C09K 8/03; C09K 8/12; C09K 8/14; E21B 21/062
See application file for complete search history.

(56) References Cited

U.S. PATENT DOCUMENTS 4,661,839 A * 4/1987 Plantholt ................ H04N 11/08
                                                        348/605
4,664,839 A   5/1987 Rieck
(Continued)

OTHER PUBLICATIONS

Clariant International Ltd., "The performance builder for a bright future SKS-6," 2013 Brochure, 68 pages.
(Continued)

*Primary Examiner* — Alicia Bland
(74) *Attorney, Agent, or Firm* — Tenley Krueger; C. Tumey Law Group PLLC (57) ABSTRACT

The presence of unmitigated metal ions in a drilling fluid can prevent acceptable rheological and fluid loss control performance from being realized during a drilling operation. Softening of a hard water source containing alkaline earth metal ions may allow the resultant treated water source to be used in formulating a drilling fluid with acceptable properties. Not all softening agents perform equivalently in this regard, and some softening agents may not be readily available. Methods for formulating a drilling fluid may comprise: providing a hard water source comprising one or more metal ions; introducing an alkali metal silicate into the hard water source to form a treated water source; and after forming the treated water source, adding a viscosifying agent to the treated water source to form a drilling fluid. The methods may further comprise drilling a borehole with the drilling fluid.

7 Claims, 2 Drawing Sheets

(51) Int. Cl.
*C09K 8/14* (2006.01)
*E21B 21/06* (2006.01)

(56) References Cited

U.S. PATENT DOCUMENTS

| | | | | |
|---|---|---|---|---|
| 5,226,481 | A * | 7/1993 | Le | C09K 8/685 |
| | | | | 166/300 |
| 5,635,458 | A | 6/1997 | Lee et al. | |
| 2006/0234873 | A1 | 10/2006 | Ballard | |
| 2009/0065259 | A1 | 3/2009 | Grott | |
| 2009/0093665 | A1 * | 4/2009 | Ross | B09B 3/0033 |
| | | | | 588/255 |
| 2011/0306524 | A1 * | 12/2011 | Smith | C09K 8/035 |
| | | | | 507/136 |
| 2013/0213656 | A1 * | 8/2013 | Ezell | E21B 36/003 |
| | | | | 166/302 |
| 2014/0135238 | A1 | 5/2014 | Breeden et al. | |

OTHER PUBLICATIONS

International Search Report and Written Opinion from PCT/US2015/053751, dated Jun. 28, 2016, 14 pages.

\* cited by examiner

USE OF ALKALI METAL SILICATES DURING FORMULATION OF DRILLING FLUIDS

BACKGROUND

The present disclosure generally relates to drilling operations and, more specifically, to methods for softening a water source during formulation of drilling fluids.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof will refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include, for example, drilling operations, fracturing operations, gravel packing operations, acidizing operations, scale dissolution and removal operations, sand control operations, consolidation operations, and the like.

A drilling fluid is usually used during drilling operations, for example, to cool the drill bit, to control pressure within the wellbore, and to suspend and transport drill cuttings from the wellbore to the earth's surface. It is also usually desirable to control loss of the drilling fluid from the wellbore into porous features of the subterranean matrix. Although fluid loss control is desirable during drilling operations for a number of reasons, weakening of the subterranean matrix due to excessive fluid incursion is often an overriding concern. Fluid loss into the subterranean matrix can usually be lessened by forming a filter cake within the wellbore. In most instances, the drilling fluid may be formulated with materials that promote formation of a filter cake upon initial spurt loss of the drilling fluid to the subterranean matrix. Depending upon the type of wellbore being drilled, the filter cake may be allowed to remain intact following drilling or undergo active or passive degradation. For example, in oil-bearing wells, the filter cake may be removed to allow production to commence, whereas in water wells and mineral exploration wells, the filter cake may be allowed to remain intact, if desired.

In order to provide drilling fluids with suitable rheological properties for conveying drill cuttings and other particulate matter within a wellbore, viscosifying agents are often employed as a component of the drilling fluids. Both clay-based and polymer-based viscosifying agents may be used for this purpose. Various metal ions located within a water source used to formulate a drilling fluid may compromise the ability of both types of viscosifying agents to function properly. Calcium ions and other alkaline earth metal ions, for example, can be particularly problematic when present in a water source, since they can result in clay flocculation and/or polymer precipitation when formulation of a drilling fluid takes place. Alkali metal ions, such as sodium ions, may be considered to be essentially non-problematic. As used herein, the term "hard water" will refer to a water source containing one or more alkaline earth metal ions. Other metal ions, such as transition metal ions, may be similarly problematic and present in a hard water source. The term "hardness" will refer to the quantity of alkaline earth and/or transition metal ions that are present in a given water source or, more generally, the extent to which the water source is "hard."

Despite the potential difficulties associated with using hard water sources for formulating drilling fluids, it can still be desirable to use such water sources in deference to deionized water sources, which may be much more costly or not readily available for drilling fluid formulation. To make a hard water source suitable for formulation into a drilling fluid, the water source may be pre-conditioned through various softening processes. As used herein, the term "softening" and grammatical variants thereof will refer to lessening of the hardness of a water source. Softening of a water source is usually conducted prior to combining a viscosifying agent with the water source to form a drilling fluid. Once the viscosifying agent has contacted the metal ions in a hard water source, there is usually no way to reverse the degradation of the viscosity properties that may result.

Soda ash (sodium carbonate) is a widely used softening agent for hard water sources that are being formulated into drilling fluids. This softening agent is inexpensive, environmentally friendly, and may provide drilling fluids having good rheological and fluid loss control performance with both clay-based and polymer-based drilling fluids. However, the commercial use of soda ash is becoming increasingly regulated due to its utilization in the manufacture of illegal drugs, and this softening agent is no longer a viable option for large-scale use in some countries, particularly in Latin America and South America. Alternative softening agents that may be used in the formulation of drilling fluids include various blend materials containing sodium hydroxide (e.g., sodium bicarbonate/sodium hydroxide blend). However, such blend materials often provide inferior rheological and fluid loss control performance compared to soda ash, and the highly caustic nature of sodium hydroxide can also be problematic.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

The present disclosure generally relates to drilling operations and, more specifically, to methods for softening a water source during formulation of drilling fluids.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, softening of a water source prior to formulation of a drilling fluid can be desirable in order to mitigate the presence of calcium ions or other alkaline earth metal ions. Soda ash is one of the more common and desirable agents that may be used for softening of a water source prior to formulation of a drilling fluid, but its use is becoming increasingly regulated and problematic. Alternative softening agents, such as a sodium bicarbonate/sodium hydroxide blend material, may be problematic in their own right due to the caustic nature of sodium hydroxide and their inferior performance compared to soda ash.

The present inventor discovered alternative materials that may be used for softening of a water source prior to its formulation into a drilling fluid. More specifically, the inventor discovered that alkali metal silicates may be used for this purpose, particularly layered alkali metal disilicates such as a layered sodium disilicate. Blends of layered alkali metal disilicates with other substances may also be used in this regard. For example, a blend of layered sodium disilicate with sodium bicarbonate may provide superior performance compared to the layered sodium disilicate alone, as discussed hereinafter. As used herein, the term "sodium disilicate" will refer to a compound having an empirical formula of $Na_2Si_2O_5$. As used herein, the term "layered," in reference to sodium disilicate, will refer to a molecular structure in which interlinked tetrahedra of silicon and oxygen atoms are present within multiple parallel sheets, and sodium ions are arranged in the interstices defined between the parallel sheets comprising the interlinked tetrahedra. Depending upon the arrangement of the interlinked tetrahedra within the parallel sheets, various polymorphs of the layered sodium disilicate are possible (see FIGS. 1A-1C), and the particular polymorph(s) obtained may depend upon the specific production technique used during manufacturing. An illustrative commercial source of a layered sodium disilicate is SKS®-6, which is available from several suppliers, such as Nease Performance Chemicals, and comprises predominantly the delta polymorph along with smaller quantities of the alpha and beta polymorphs. Any of these polymorphs or mixtures thereof may be suitably used in the embodiments described herein. Further details concerning SKS®-6 are provided hereinbelow.

Layered sodium disilicates may provide a number of advantages in the course of formulating a drilling fluid, specifically when the layered sodium disilicate is used for softening a hard water source before combining a viscosifying agent therewith. Foremost, the layered sodium disilicate and the alkaline earth metal ions it helps to mitigate may suitably remain within the formulated drilling fluid without unacceptably compromising the drilling fluid's rheological and fluid loss control performance. That is, filtration, decantation, or other like separation processes for the layered sodium disilicate or an ion exchange product thereof are not needed in order for the drilling fluid to have acceptable performance. In fact, the inventor believes that the layered sodium disilicate itself may become incorporated within a filter cake and contribute to the fluid loss control performance of the drilling fluid. Moreover, layered sodium disilicates or a blend material thereof are compatible with both clay-based drilling fluids (e.g., bentonite clay-based drilling fluids) and polymer-based drilling fluids (e.g., drilling fluids containing partially hydrolyzed polyacrylamides or other suitable oilfield polymers), where the clay or polymer serves a role in viscosifying the drilling fluid. For both types of viscosifying agent, the rheological performance of the formulated drilling fluid may be at least comparable to that obtained with a sodium bicarbonate/sodium hydroxide blend, a primary softening agent alternative to soda ash, and the performance may even approach that obtained when using soda ash itself. Compared to a sodium bicarbonate/sodium hydroxide blend, however, layered sodium disilicate or a blend material thereof may be advantageous due to its low cost and lack of caustic behavior compared to sodium hydroxide. Furthermore, a decreased degree of regulation compared to soda ash may make layered sodium disilicate a preferable softening agent. Finally, layered sodium disilicate is commonly used in the detergent industry due to its favorable environmental and toxicity profile, and these benefits can be similarly advantageous in the drilling industry.

Layered sodium disilicates also can provide good fluid loss control performance when used for softening a hard water source prior to viscosifying the water source and formulating a drilling fluid. In fact, layered sodium disilicates may surprisingly result in drilling fluids having enhanced fluid loss control performance compared to that obtained using either soda ash or a sodium bicarbonate/sodium hydroxide blend as a softening agent. Without being bound by any theory or mechanism, the inventor believes that the enhanced fluid loss control performance may result from an incomplete dissolution of layered sodium disilicates upon interacting with an aqueous fluid. Instead, the inventor believes that the layered structure breaks down upon interacting with an aqueous fluid, leaving behind microscopically small, suspended particles that may result in more effective filter cake formation. The metal ions in the hard water source may be sequestered by these particles such that they are then unable to interfere with the viscosification process. Desirably, the fluid loss control performance enhancement may be realized for both clay-based drilling fluids and polymer-based drilling fluids. Hence, the viscosifying agent may be selected to accommodate the needs of a particular drilling operation, considerations for which will be evident to one having ordinary skill in the art, with minimal fear of encountering an incompatibility that would result in poor rheological or fluid loss control properties being obtained.

Even more surprisingly, the fluid loss control performance may be particularly enhanced when using a blend of a layered sodium disilicate with another material, such as a mixture of a layered sodium disilicate and sodium bicarbonate or another alkali metal bicarbonate. Such enhancement of the fluid loss control performance cannot be explained by the layered sodium disilicate simply becoming incorporated within a filter cake, since there is proportionally less layered sodium disilicate present that may contribute to filter cake formation when a blend material is used. Hence, soluble sodium bicarbonate would be expected to preclude filter cake deposition, not enhance it. Moreover, the enhancement of the fluid loss control performance may be greater in polymer-based drilling fluids than in clay-based drilling fluids. Without being bound by any theory or mechanism, it is believed that the polymers in polymer-based drilling fluids are substantially soluble initially and do not provide effective solids for promoting fluid loss control. Hence, the layered sodium disilicate may hasten the availability of productive solids in such drilling fluids to provide effective fluid loss control. In clay-based drilling fluids, in contrast, the insoluble clay particles are already capable of providing some degree of fluid loss control, and the fluid loss control performance enhancement is believed to be somewhat less pronounced as a result. In either case, the enhancement of the fluid loss control performance may allow the drilling fluids to be used more efficiently in the course of drilling a borehole during a drilling operation. The terms "borehole" and "wellbore" may be used synonymously herein.

In various embodiments, drilling fluids of the present disclosure may comprise an aqueous carrier fluid and a viscosifying agent. The aqueous carrier fluid may comprise an alkali metal silicate and one or more metal ions, wherein the aqueous carrier fluid is formed by softening a hard water source containing the one or more metal ions with the alkali metal silicate. That is, the drilling fluids of the present disclosure may comprise a viscosifying agent within an aqueous carrier fluid that has been softened with an alkali metal silicate, particularly a layered alkali metal disilicate such as a layered sodium disilicate.

The hard water source used for formulating the drilling fluids described herein is not considered to be particularly limited. Illustrative hard water sources may include, for example, fresh water, salt water, sea water, brine, ground water, process water and the like. As long as the hard water source does not contain other components that detrimentally impact the properties of the drilling fluid upon its formulation, the hard water source may be suitably used. In illustrative embodiments, the pH of the aqueous carrier fluid may range between about 4 and about 11, or between about 5 and about 10, or between about 6 and about 9, after being softened with an alkali metal silicate according to the disclosure herein.

In more particular embodiments, the hard water source may comprise one or more alkaline earth metal cations. As used herein, the term "alkaline earth metal cations" will refer to one or more metal cations comprising a metal from Group 2 of the periodic table of the elements. In still more particular embodiments, the one or more metal ions within the hard water source may comprise at least calcium ions.

Figure 1A:
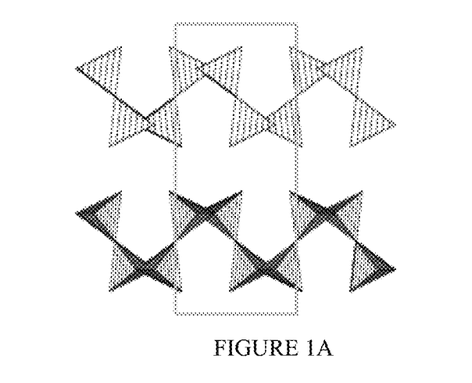
FIGS. 1A-1C show illustrative diagrams of the unit cell structures of the alpha, beta, and delta polymorphs of layered sodium disilicate, respectively.
Figure 1B:
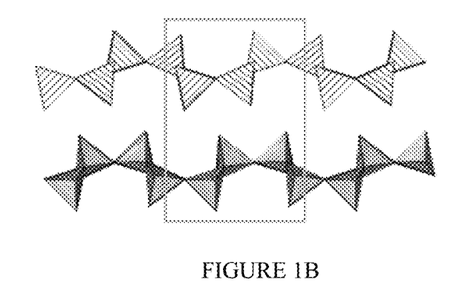
Figure 1C:
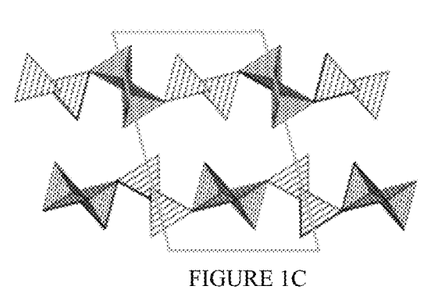

In various embodiments of the present disclosure, the alkali metal silicate may comprise a layered alkali metal disilicate. In still more particular embodiments of the present disclosure, the layered alkali metal disilicate may comprise a layered sodium disilicate, including any of its polymorphic forms or any mixtures thereof. Suitable polymorphic forms of layered sodium disilicate may include, for example, the alpha polymorph, the beta polymorph, the delta polymorph, or any combination thereof. In some embodiments, the delta polymorph may be predominant and a particularly active form. FIGS. 1A-1C show illustrative diagrams of the unit cell structures of the alpha, beta, and delta polymorphs of layered sodium disilicate, respectively. The boxes in FIGS. 1A-1C indicate the unit cell structure, and sodium ions are not depicted for clarity. Silicon and oxygen comprise the intersecting tetrahedra of the layered structure.

In various embodiments, the alkali metal silicate may be added to the hard water source as a solid. More particularly, a layered alkali metal disilicate, such as a layered sodium disilicate, may be added to a hard water source as a solid in the course of formulating a drilling fluid. Upon interacting with the aqueous phase in the hard water source, the layered sodium disilicate may at least partially exchange its sodium ions with problematic metal ions in the hard water source, such as calcium ions or other alkaline earth metal ions, and undergo partial dissolution. It is believed, however, that the dissolution process is incomplete and the layered sodium disilicate remains as a plurality of microscopically small, insoluble particles within the aqueous phase following treatment of the hard water source and its formulation into a drilling fluid.

Similarly, the metal ions sequestered from the hard water source, such as calcium ions or other alkaline earth metal ions, may remain in the aqueous phase following ion exchange with the layered sodium disilicate. Upon undergoing ion exchange, the metal ions may become sequestered within the layered structure, such that they are no longer capable of producing a problematic interaction with the viscosifying agent. Accordingly, the metal ions from the hard water source may be incorporated within the formulated drilling fluid, in sequestered form, since they no longer remain capable of substantially impacting the drilling fluid's properties following ion exchange.

One suitable source of layered sodium disilicate for softening a hard water source may be SKS®-6, which comprises predominantly the delta polymorph of layered sodium disilicate. Depending on the commercial grade used, this material may have a particle size ranging between about 90 microns and about 150 microns or between about 500 microns and about 700 microns. In more particular embodiments, the layered sodium disilicate or other alkali metal silicate used in conjunction with the disclosure herein may range in size from about 50 microns to about 1000 microns, or from about 100 microns to about 150 microns, or from about 100 microns to about 200 microns, or from about 300 microns to about 400 microns, or from about 500 microns to about 600 microns, or from about 600 microns to about 700 microns, or from about 800 microns to about 1000 microns, or from about 400 microns to about 800 microns, or from about 400 microns to about 600 microns, or from about 600 microns to about 750 microns.

In some embodiments, the drilling fluids described herein may comprise a further softening additive used in combination with the alkali metal silicate. In more particular embodiments, sodium bicarbonate or another alkali metal bicarbonate salt may be present in the drilling fluid in combination with the alkali metal silicate, particularly layered sodium disilicate. That is, the hard water source may be further softened with the sodium bicarbonate or other alkali metal bicarbonate salt. As discussed above, the use of sodium bicarbonate or another alkali metal bicarbonate salt in combination with the layered sodium disilicate may provide better rheological and fluid loss control performance compared to that of the layered sodium disilicate alone.

In some embodiments, the drilling fluids described herein may comprise further particulate materials, in addition to the alkali metal silicate used in softening the hard water source. The further particulate materials may help supplement the fluid loss control performance of the drilling fluids. Illustrative examples of additional particulate materials that may be present include, for example, silica particulates, alumina particulates, glass microparticles and microspheres, ceramic microparticles and microspheres, and polymer particulates and microspheres. In some embodiments, the further particulate materials may have a maximum particle size of about 100 microns, or a maximum particle size of about 50 microns, or a maximum particle size of about 25 microns, or a maximum particle size of about 10 microns. In some embodiments, the further particulate materials may have a bimodal particle size distribution. In some or other embodiments, the further particulate materials may be non-biodegradable.

Suitable concentrations of the further particulate materials in the drilling fluids described herein may range between about 0.2 pounds per barrel and about 2 pounds per barrel.

In more particular embodiments, the further particulate materials may range in concentration between about 0.5 pounds per barrel and about 2 pounds per barrel.

Suitable concentrations for the alkali metal silicate, particularly a layered alkali metal disilicate such as layered sodium disilicate, may be determined based upon the hardness of the water source being formulated into the drilling fluid. In some embodiments, the alkali metal silicate (e.g., layered sodium disilicate) may be present in the formulated drilling fluids at a concentration ranging between about 0.025 pounds per barrel and about 2 pounds per barrel. In more specific embodiments, the alkali metal silicate may be present in a concentration ranging between about 0.2 pounds per barrel and about 2 pounds per barrel. The optional further softening additive (e.g., sodium bicarbonate or other alkali metal bicarbonate) may be present in similar concentration ranges.

In some embodiments, the drilling fluids may further comprise a weighting agent, optionally in further combination with other particulate materials. In some embodiments, barite may comprise the weighting agent. Other suitable weighting agents may include materials such as, for example, hematite, magnetite, iron oxides, illmenite, siderite, celestite, dolomite, olivine, calcite, magnesium oxides, halites, strontium sulfate, manganese tetroxide, and the like. The weighting agent and its quantity may be selected such that the drilling fluid has a density ranging between about 10 pounds per gallon and about 50 pounds per gallon. Lower or higher density values may also be appropriate depending upon the requirements of a particular drilling operation.

Depending upon the requirements of a particular drilling operation, the drilling fluid may comprise a polymer-based drilling fluid or a clay-based drilling fluid. That is, the viscosifying agent present in the aqueous carrier fluid of the drilling fluid may be either polymer-based or clay-based. Suitable examples of each type of viscosifying agent are discussed hereinafter.

Suitable clay-based viscosifying agents may comprise a bentonite clay. Suitable sources of bentonite-containing viscosifying agents may include, for example, AQUAGEL, AQUAGEL GOLD SEAL, QUIK-GEL, QUIK-GEL GOLD, BORE-GEL and QUIK-BORE, each of which is available from Halliburton Energy Services, Inc. Other suitable clays for achieving viscosification of a drilling fluid may include, for example, kaolinite, illite, chlorite, hectorite, montmorillonite, or any combination of these clays with each other or with bentonite.

In some embodiments, suitable viscosifying agents may comprise a partially hydrolyzed polyacrylamide polymer or another suitable type of oilfield polymer. As used herein, the term "partially hydrolyzed polyacrylamide" will refer to an acrylamide polymer or co-polymer in which a portion of the amide side chains have been hydrolyzed to carboxylic acids or a salt thereof. Particularly suitable viscosifying agents comprising a partially hydrolyzed polyacrylamide may include, for example, POLY-BORE, EZ-MUD, EZ-MUD GOLD, EZ-MUD DP, and QUIK-MUD GOLD, each of which is available from Halliburton Energy Services, Inc. Other oilfield polymers suitable for providing viscosification will be familiar to one having ordinary skill in the art. Other illustrative polymers that may be suitable for enhancing viscosity may include, for example, high molecular weight hydroxyethylcellulose, carboxymethylcellulose, polyanionic cellulose, xanthan, guar, starch, polyacrylate and polymethacrylate polymers, polyacrylamide and polymethacrylamide polymers, acrylamide methylpropanesulfonate polymers and copolymers, maleic anhydride polymers and copolymers, and the like.

In still other various embodiments, the drilling fluids described herein may further comprise numerous other components such as, for example, salts, pH control additives, foaming agents, antifoaming agents, breakers, biocides, additional fluid loss control agents, stabilizers, chelating agents, scale inhibitors, gases, mutual solvents, particulates, corrosion inhibitors, oxidizing agents, reducing agents, antioxidants, relative permeability modifiers, other viscosifying agents, proppant particulates, gravel particulates, scale inhibitors, emulsifying agents, de-emulsifying agents, iron control agents, clay control agents, flocculants, scavengers, lubricants, friction reducers, weighting agents, hydrate inhibitors, consolidating agents, any combination thereof, and the like. A person having ordinary skill in the art and the benefit of this disclosure will recognize when such additional components should be included in a drilling fluid used to produce a particular type of wellbore, as well as the appropriate amounts to include in the drilling fluid.

Accordingly, the present disclosure describes various methods suitable for preparing a drilling fluid from a hard water source and/or utilizing such a drilling fluid in a drilling operation. In some embodiments, the methods may comprise: providing a hard water source comprising one or more metal ions, introducing an alkali metal silicate into the hard water source to form a treated water source, and after forming the treated water source, adding a viscosifying agent to the treated water source to form a drilling fluid.

In various embodiments, the alkali metal silicate may be introduced into or combined with the hard water source as a solid. As discussed above, the alkali metal silicate may at least partially dissolve upon contacting the hard water source. In the case of a layered sodium disilicate, for example, the layered sodium disilicate may partially dissolve to form a suspension of microscopic particles in the resulting treated water source. These microscopic particles become incorporated in the drilling fluid upon its formulation. Without being bound by any theory or mechanism, the inventor believes that the undissolved particles of layered sodium disilicate or another alkali metal silicate may promote the enhanced fluid loss control properties of the drilling fluids described herein through filter cake formation.

In alternative embodiments, the alkali metal silicate may be introduced into or combined with the hard water source as a liquid. For example, a liquid mixture of water glass or a substance related to water glass may be introduced into the hard water source to accomplish at least some of the features described herein, in some embodiments.

As discussed above, additional components may be used in combination with the alkali metal silicate, particularly a layered sodium disilicate, in the course of forming a treated water source and/or a drilling fluid. Use of one or more additional components in combination with an alkali metal silicate may result in improved rheological and/or fluid loss control performance compared to use of the alkali metal silicate alone. In some embodiments, use of an alkali metal silicate in combination with one or more additional components may provide a drilling fluid having rheological and/or fluid loss control performance that is at least comparable to that obtained using an equivalent quantity of sodium bicarbonate/sodium hydroxide blend. In some embodiments, use of an alkali metal silicate in combination with one or more additional components may provide a drilling fluid having fluid loss control performance exceeding that obtained using an equivalent quantity of sodium bicarbonate/sodium hydroxide blend or soda ash.

In more specific embodiments, methods of the present disclosure may further comprise introducing an alkali metal bicarbonate salt into the hard water source in conjunction with the alkali metal silicate. In still more specific embodiments, the alkali metal bicarbonate salt may comprise sodium bicarbonate, and any suitable source of sodium bicarbonate may be used. In some embodiments, the alkali metal bicarbonate salt may be added to the hard water source as a solid, and it may be added in combination with the alkali metal silicate, also in a solid form. The alkali metal silicate, particularly layered sodium disilicate, and the alkali metal bicarbonate salt may be added to the hard water source concurrently or separately. When added separately, the alkali metal silicate may be added to the hard water source before or after the alkali metal bicarbonate salt. When added concurrently, the alkali metal silicate and the alkali metal bicarbonate salt may be pre-mixed and added to the hard water source jointly, or they may be added to the hard water source at the same time from separate sources.

In further embodiments, methods of the present disclosure may comprise drilling a borehole with a drilling fluid formulated according to the description herein. As used herein, the term "borehole" will refer to an elongated pathway excavated in an earthen structure, such as a subterranean formation. The borehole may comprise a portion of a mineral exploration well in some embodiments, or a portion of a water well in other various embodiments. In still other various embodiments, the borehole may comprise a portion of an oil well, from which a hydrocarbon resource is to be produced. In some embodiments, drilling the borehole may comprise a "drill in" process. Furthermore, the drilling fluids described herein may be used in both normal and reverse circulation drilling techniques.

In various embodiments, drilling a borehole with the disclosed drilling fluids may further comprise forming a filter cake within the borehole with one or more components of the drilling fluid. Forming the filter cake within the borehole may comprise contacting the outside walls of the borehole (i.e., the surface of the earthen structure) with the drilling fluid, and passing at least a portion of the aqueous carrier fluid comprising the treated water source into the porosity of the subterranean formation (i.e., through spurt loss). As the aqueous carrier fluid passes into the porosity of the subterranean formation, it may deposit various components within the drilling fluid as the filter cake, eventually shutting off flow into the formation's porosity as the filter cake builds in thickness.

In still further embodiments, methods of the present disclosure may further comprise removing the filter cake from the borehole. Removing at least a portion of the filter cake from the borehole can allow the resumption of fluid flow from the subterranean formation into the interior of the borehole. For example, removing the filter cake from the borehole can allow production of a hydrocarbon resource to take place. In some embodiments, removing the filter cake may comprise breaking a polymer within the filter cake. Suitable breakers for this purpose may include, for example, an oxidant, a surfactant, a dispersant, an acid, an enzyme, or any combination thereof. Various examples of these types of breakers and the situations in which they are suitably used will be familiar to one having ordinary skill in the art. Mechanical agitation may also be performed to affect removal of a filter cake in some embodiments. Various combinations of such filter cake removal techniques may also be used.

Accordingly, in more specific embodiments, methods of the present disclosure may comprise: combining a layer sodium disilicate with a hard water source comprising at least calcium ions; allowing at least a portion of the calcium ions to undergo ion exchange with the layered sodium disilicate to form a treated water source; after forming the treated water source, adding a viscosifying agent to the treated water source to form a drilling fluid; and drilling a borehole with the drilling fluid. As discussed above, the viscosifying agent may be clay-based or polymer-based, and additional components may be used in conjunction with the layered sodium disilicate for modifying the properties of the drilling fluid. For example, in some embodiments, the methods may further comprise combining sodium bicarbonate or another alkali metal bicarbonate salt with the hard water source in conjunction with the layered sodium disilicate.

The exemplary drilling fluids disclosed herein may directly or indirectly affect one or more components or pieces of equipment associated with the preparation, delivery, recapture, recycling, reuse, and/or disposal of the disclosed drilling fluids. For example, and with reference to FIG. 2, the disclosed drilling fluids may directly or indirectly affect one or more components or pieces of equipment associated with an exemplary wellbore drilling assembly 100, according to one or more embodiments. It should be noted that while FIG. 2 generally depicts a land-based drilling assembly, one having ordinary skill in the art will readily recognize that the principles described herein are equally applicable to subsea drilling operations that employ floating or sea-based platforms and rigs, without departing from the scope of the disclosure.

Figure 2:
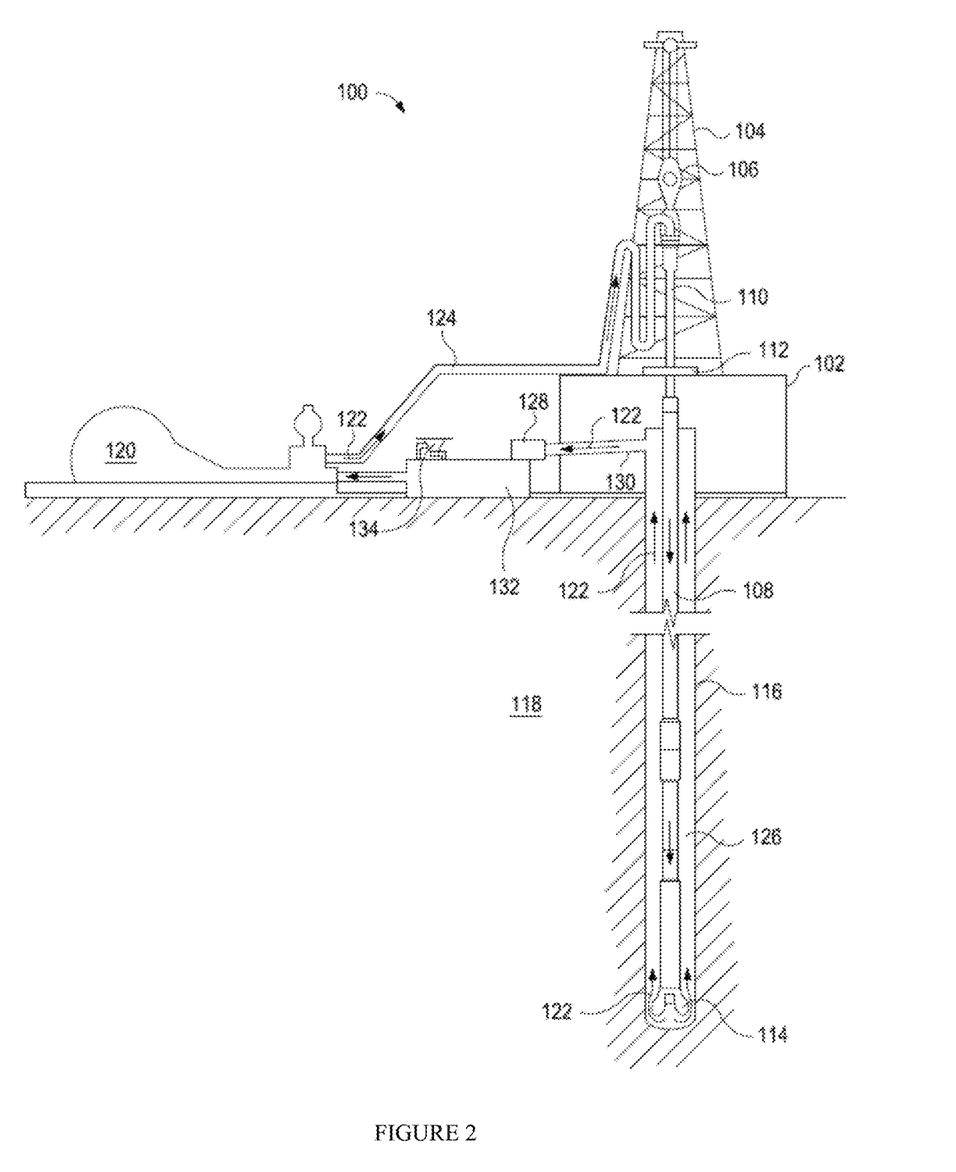
FIG. 2 shows an illustrative schematic of a drilling assembly using the drilling fluids of the present disclosure, according to one or more embodiments.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to one having ordinary skill in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, one having ordinary skill in the art will readily appreciate that the fluid processing unit(s) 128 may be arranged at any other location in the drilling assembly 100 to facilitate its proper function, without departing from the scope of the disclosure.

One or more of the disclosed components may be added to the drilling fluid 122 via a mixing hopper 134 communicably coupled to or otherwise in fluid communication with the retention pit 132. The mixing hopper 134 may include, but is not limited to, mixers and related mixing equipment known to one having ordinary skill in the art. In other embodiments, however, the disclosed components may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed components may be stored, reconditioned, and/or regulated until added to the drilling fluid 122.

As mentioned above, the disclosed drilling fluids may directly or indirectly affect the components and equipment of the drilling assembly 100. For example, the disclosed drilling fluids may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the exemplary drilling fluids.

The disclosed drilling fluids may directly or indirectly affect the pump 120, which representatively includes any conduits, pipelines, trucks, tubulars, and/or pipes used to fluidically convey the drilling fluids downhole, any pumps, compressors, or motors (e.g., topside or downhole) used to drive the drilling fluids into motion, any valves or related joints used to regulate the pressure or flow rate of the drilling fluids, and any sensors (i.e., pressure, temperature, flow rate, etc.), gauges, and/or combinations thereof, and the like. The disclosed drilling fluids may also directly or indirectly affect the mixing hopper 134 and the retention pit 132 and their assorted variations.

The disclosed drilling fluids may also directly or indirectly affect the various downhole equipment and tools that may come into contact with the drilling fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling fluids may also directly or indirectly affect any downhole heat exchangers, valves and corresponding actuation devices, tool seals, packers and other wellbore isolation devices or components, and the like associated with the wellbore 116. The disclosed drilling fluids may also directly or indirectly affect the drill bit 114, which may include, but is not limited to, roller cone bits, PDC bits, natural diamond bits, any hole openers, reamers, coring bits, etc.

While not specifically illustrated herein, the disclosed drilling fluids may also directly or indirectly affect any transport or delivery equipment used to convey the drilling fluids to the drilling assembly 100 such as, for example, any transport vessels, conduits, pipelines, trucks, tubulars, and/or pipes used to fluidically move the drilling fluids from one location to another, any pumps, compressors, or motors used to drive the drilling fluids into motion, any valves or related joints used to regulate the pressure or flow rate of the drilling fluids, and any sensors (i.e., pressure and temperature), gauges, and/or combinations thereof, and the like.

Embodiments disclosed herein include:

A. Methods for forming a drilling fluid from a hard water source. The methods comprise: providing a hard water source comprising one or more metal ions; introducing an alkali metal silicate into the hard water source to form a treated water source; and after forming the treated water source, adding a viscosifying agent to the treated water source to form a drilling fluid.

B. Methods for forming a drilling fluid from a hard water source and drilling a borehole therewith. The methods comprise: combining a layered sodium disilicate with a hard water source comprising at least calcium ions; allowing at least a portion of the calcium ions to undergo ion exchange with the layered sodium disilicate to form a treated water source; after forming the treated water source, adding a viscosifying agent to the treated water source to form a drilling fluid; and drilling a borehole with the drilling fluid.

C. Drilling fluids formed from a hard water source. The drilling fluids comprise: an aqueous carrier fluid comprising an alkali metal silicate and one or more metal ions, the aqueous carrier fluid being formed by softening a hard water source containing the one or more metal ions with the alkali metal silicate; and a viscosifying agent.

Each of embodiments A, B, and C may have one or more of the following additional elements in any combination:

Element 1: wherein the alkali metal silicate is introduced into the hard water source as a solid.

Element 2: wherein the alkali metal silicate comprises a layered sodium disilicate.

Element 3: wherein the one or more metal ions comprise at least calcium ions.

Element 4: wherein the viscosifying agent comprises a clay-based viscosifying agent.

Element 5: wherein the viscosifying agent comprises a polymer-based viscosifying agent.

Element 6: wherein the method further comprises introducing an alkali metal bicarbonate salt into the hard water source in conjunction with the alkali metal silicate.

Element 7: wherein the alkali metal bicarbonate salt comprises sodium bicarbonate.

Element 8: wherein the layered sodium disilicate and the alkali metal bicarbonate salt are introduced into the hard water source concurrently.

Element 9: wherein the borehole comprises a portion of a mineral exploration well or a portion of a water well.

Element 10: wherein the layered sodium disilicate is combined with the hard water source as a solid.

Element 11: wherein the method further comprises combining sodium bicarbonate with the hard water source in conjunction with the layered sodium disilicate.

Element 12: wherein the layered sodium disilicate and the sodium bicarbonate are combined with the hard water source concurrently.

Element 13: wherein the aqueous carrier fluid further comprises sodium bicarbonate, the hard water source being further softened with the sodium bicarbonate.

By way of non-limiting example, exemplary combinations applicable to A, B, C include:

The method of A in combination with elements 1 and 2.
The method of A in combination with elements 2 and 3.
The method of A in combination with elements 1-3.
The method of A in combination with elements 2 and 4.
The method of A in combination with elements 2 and 5.
The method of A in combination with elements 2-4.
The method of A in combination with elements 2, 3 and 5.
The method of A in combination with elements 2 and 6.
The method of A in combination with elements 2, 6 and 7.

The method of A in combination with elements 2, 4, 6 and 7.

The method of A in combination with elements 2, 5, 6 and 7.

The method of A in combination with elements 6 and 7.

The method of A in combination with elements 6-8.

The method of A in combination with elements 3 and 4.

The method of A in combination with elements 3 and 5.

The method of B in combination with elements 10 and 11.

The method of B in combination with elements 9-11.

The method of B in combination with elements 4, 10 and 11.

The method of B in combination with elements 4 and 9-11.

The method of B in combination with elements 5, 10 and 11.

The method of B in combination with elements 5 and 9-11.

The method of B in combination with elements 11 and 12.

The method of B in combination with elements 9, 11 and 12.

The method of B in combination with elements 10-12.

The method of B in combination with elements 9-12.

The drilling fluid of C in combination with elements 2 and 3.

The drilling fluid of C in combination with elements 2 and 4.

The drilling fluid of C in combination with elements 2 and 5.

The drilling fluid of C in combination with elements 3 and 4.

The drilling fluid of C in combination with elements 3 and 5.

The drilling fluid of C in combination with elements 2-4.

The drilling fluid of C in combination with elements 2, 3 and 5.

The drilling fluid of C in combination with elements 2 and 13.

The drilling fluid of C in combination with elements 2, 4 and 13.

The drilling fluid of C in combination with elements 2, 5 and 13.

To facilitate a better understanding of the embodiments of the present disclosure, the following examples of preferred or representative embodiments are given. In no way should the following examples be read to limit, or to define, the scope of the disclosure.

EXAMPLES

Example 1: Performance of Bentonite-Based Drilling Fluids Formulated from Pre-Treated Hard Water A simulated hard water source was prepared by dissolving $CaSO_4$ in deionized water at a concentration of 0.3 pounds per barrel (300 mg of $CaSO_4$ per 350 mL of water). Thereafter, various softening agents (see Table 1) were added at a total concentration of 0.5 pounds per barrel to determine their effects upon formulation of the hard water source into a drilling fluid. Following a one-hour contact time with the softening agent(s), QUIK-GEL GOLD (a bentonite-based drilling fluid additive available from Halliburton Energy Services) was added at a loading of 10.5 pounds per barrel and the blend was mixed on a Hamilton multi-mixer for 20 minutes. Rheological and fluid loss performance were then determined, as set forth in Table 1. Viscosity measurements were obtained using a Fann 35A viscometer and a R1-B1-F1 rotor-bob-torsion spring combination at ambient temperature and pressure. Fluid loss was measured in terms of the quantity of filtrate collected over 30 minutes after passing the formulated drilling fluid through a hardened porous filter paper using an API filter press at ambient temperature and a pressure of 100 psi.

TABLE 1

|  | Control | Sample 1 | Sample 2 | Sample 3 | Sample 4 |
| --- | --- | --- | --- | --- | --- |
| Softening Agent Load in Pounds per Barrel | | | | | |
| Soda Ash | — | 0.5 | — | — | — |
| Blend of NaOH and $NaHCO_3$ | — | — | 0.5 | — | — |
| SKS ®-6 | — | — | — | 0.5 | — |
| 1:1 Blend of SKSC ®-6 and $NaHCO_3$ | — | — | — | — | 0.5 |
| Rheology | | | | | |
| 600 rpm dial reading | 13 | 27.5 | 20 | 22 | 19 |
| 300 rpm dial reading | 9 | 21.5 | 14.5 | 17 | 14 |
| 200 rpm dial reading | 7.5 | 19 | 12 | 14.5 | 12 |
| 100 rpm dial reading | 5.5 | 16 | 9.5 | 12 | 9 |
| 6 rpm dial reading | 2.5 | 10 | 5 | 7 | 4 |
| 3 rpm dial reading | 2 | 9 | 4 | 5.5 | 3.5 |
| 10-Second Gel (lb/100 $ft^2$) | 3.5 | 8 | 7 | 7 | 5.5 |
| 10-Minute Gel (lb/100 $ft^2$) | 5 | 10 | 6 | 9 | 9 |
| Fluid Loss | | | | | |
| Volume of Filtrate Over 30 Minutes (mL) | 31 | 23 | 24 | 26 | 20 |
| Miscellaneous | | | | | |
| Post-Treatment pH | 5 | 9-10 | 7-8 | 10-11 | 8-9 |
| Post-Treatment Hardness | 250-425 | 25 | 25-50 | 120-250 | 25-50 |

As shown in Table 1, the soda ash softening agent (Sample 1) produced the best rheological performance in the bentonite-based fluid. Good fluid loss performance was also obtained with this softening agent. There was a decrease in rheological performance when utilizing the $NaOH/NaHCO_3$ blend for softening (Sample 2), although the fluid loss performance was similar. The rheological performance of Samples 3 and 4 was similar to that of Sample 2, and the fluid loss performance was either slightly higher or lower than that of Samples 1 and 2, depending upon the particular softening agent used. The fluid loss control performance of Sample 3 was considerably higher than when sodium bicarbonate was also present in Sample 4.

Example 2: Performance of Polymer-Based Drilling Fluids Formulated from Pre-Treated Hard Water A simulated hard water source was prepared as in Example 1 and various softening agents (see Table 2) were again added at a total concentration of 0.5 pounds per barrel. Following a one-hour contact time with the softening agent(s), POLY-BORE (a partially hydrolyzed polyacrylamide drilling fluid additive available from Halliburton Energy Services) was added at a loading of 0.42 pounds per barrel. Rheological and fluid loss performance were as set forth in Table 2.

TABLE 2

|  | Control | Sample 1 | Sample 2 | Sample 3 | Sample 4 |
|---|---|---|---|---|---|
| Softening Agent Load in Pounds per Barrel | | | | | |
| Soda Ash | — | 0.5 | — | — | — |
| Blend of NaOH and NaHCO$_3$ | — | — | 0.5 | — | — |
| SKS ®-6 | — | — | — | 0.5 | — |
| 1:1 Blend of SKS ®-6 and NaHCO$_3$ | — | — | — | — | 0.5 |
| Rheology | | | | | |
| 600 rpm dial reading | 13 | 27 | 26 | 18 | 26 |
| 300 rpm dial reading | 6.5 | 17 | 15 | 11.5 | 15 |
| 200 rpm dial reading | 5 | 12 | 10 | 8.5 | 10 |
| 100 rpm dial reading | 3 | 7 | 5.5 | 5.5 | 6 |
| 6 rpm dial reading | 0.5 | 1.5 | 1 | 1.5 | 1.5 |
| 3 rpm dial reading | 0.5 | 1 | 0.5 | 1 | 1 |
| Average Marsh Funnel Value | 61.5 | 87.5 | 90.5 | 61.5 | 91.5 |
| Fluid Loss | | | | | |
| Volume of Filtrate Over 7.5 Minutes (mL) | 45.5 | 12 | 16 | 8 | 7.5 |
| Volume of Filtrate Over 30 Minutes (mL) | 146 | 35 | 50 | 27 | 20 |

In the case of a polymer-based drilling fluid, the combination of SKS®-6 and sodium bicarbonate (Sample 4) produced rheological performance that was at least comparable to that obtained using soda ash (Sample 1) or a sodium bicarbonate/sodium hydroxide blend (Sample 2). The fluid loss performance of both Samples 3 and 4, each containing SKS®-6, was superior to that obtained using either soda ash or a sodium bicarbonate/sodium hydroxide blend, however.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
   combining a layered sodium disilicate with a hard water source comprising at least calcium ions;
   allowing at least a portion of the calcium ions to undergo ion exchange with the layered sodium disilicate to form a treated water source;
   after forming the treated water source, adding a viscosifying agent to the treated water source to form a drilling fluid; and
   drilling a borehole with the drilling fluid.

2. The method of claim 1, wherein the borehole comprises a portion of a mineral exploration well or a portion of a water well.

3. The method of claim 1, wherein the layered sodium disilicate is combined with the hard water source as a solid.

4. The method of claim 1, wherein the viscosifying agent comprises a clay-based viscosifying agent.

5. The method of claim 1, wherein the viscosifying agent comprises a polymer-based viscosifying agent.

6. The method of claim 1, further comprising:
   combining sodium bicarbonate with the hard water source in conjunction with the layered sodium disilicate.

7. The method of claim 6, wherein the layered sodium disilicate and the sodium bicarbonate are combined with the hard water source concurrently.

* * * * *